(12) United States Patent
Hirai

(10) Patent No.: US 8,474,339 B2
(45) Date of Patent: Jul. 2, 2013

(54) ELECTRIC ACTUATOR

(75) Inventor: Masanori Hirai, Gifu (JP)

(73) Assignee: Nabtesco Corporation, Tokyo (JP)

( * ) Notice: Subject to any disclaimer, the term of this patent is extended or adjusted under 35 U.S.C. 154(b) by 882 days.

(21) Appl. No.: 12/628,731

(22) Filed: Dec. 1, 2009

(65) Prior Publication Data

US 2010/0132350 A1 Jun. 3, 2010

(30) Foreign Application Priority Data

Dec. 1, 2008 (JP) .................................. 2008-306517

(51) Int. Cl.
*F16H 25/20* (2006.01)
(52) U.S. Cl.
USPC ........................................ 74/89.39; 74/89.23
(58) Field of Classification Search
USPC ............................... 74/89.23, 89.39; 192/141
See application file for complete search history.

(56) References Cited

U.S. PATENT DOCUMENTS

| 1,730,797 | A | * | 10/1929 | Zoller et al. | .................. | 192/141 |
| 3,823,758 | A | * | 7/1974 | Heese | ............................ | 160/188 |
| 7,397,209 | B2 | * | 7/2008 | Hirai | ............................ | 318/280 |
| 2010/0313689 | A1 | * | 12/2010 | Quenerch'du et al. | ...... | 74/89.39 |

FOREIGN PATENT DOCUMENTS

| JP | 11-272332 | * | 3/1998 |
| JP | 11-59592 | | 3/1999 |
| JP | 2003-53587 | * | 2/2003 |

* cited by examiner

*Primary Examiner* — William C Joyce
(74) *Attorney, Agent, or Firm* — Osha • Liang LLP

(57) ABSTRACT

An electric actuator includes a first port, a second port, and a cylinder chamber connecting passage. The first port is formed on an inner face of a rod-side cylinder chamber of a cylinder body. The second port is formed on an inner face of a head-side cylinder chamber of the cylinder body. The cylinder chamber connecting passage connects the first port and the second port. In the electric actuator, a piston part of a piston rod closes the first port 6 when the piston rod advances.

9 Claims, 3 Drawing Sheets

ELECTRIC ACTUATOR

CROSS REFERENCE TO RELATED APPLICATION

The present application claims priority from Japanese Patent Application No. 2008-306517, which was filed on Dec. 1, 2008, the disclosure of which is herein incorporated by reference in its entirety.

BACKGROUND OF THE INVENTION

1. Field of the Invention

The present invention relates to an electric actuator, particularly to an electric actuator suitable for lifting an aircraft leg.

2. Description of the Related Art

An example of a technique related to an actuator for lifting an aircraft leg is described in Japanese Unexamined Patent Application Publication No. 1999-59592. The leg-lifting device described in Japanese Unexamined Patent Application Publication No. 1999-59592 intends to achieve a simple layout by unitizing a leg-lifting mechanism including emergency leg-extension. The leg-lifting device includes the following members mounted in a common body: a pump as a hydraulic pressure source; a motor which drives the pump; a rod which extends in response to discharge pressure of the pump; and a mechanical lock mechanism which regulates extension of the rod.

Here, research and development of EMAs (Electro Mechanical Actuator) and EHAs (Electro Hydrostatic Actuator) are worldwide trends in the field of aircraft technology to eliminate the hydraulic system in order to realize a lighter aircraft. As far as lifting system of a lifting device for an aircraft leg is concerned, however, hydraulic actuators still remain as mainstream.

An example of an EMA developed for lifting an aircraft leg is illustrated in FIG. 3. An electric actuator 101 illustrated in FIG. 3 includes a cylinder body 84; a screw shaft 3 provided in the cylinder body 84 and rotated by an electric motor 23; and a piston rod 83 into which a screw shaft 3 is screwed. Further, a mechanical brake 81 is provided in the cylinder body 84. A side face of an end portion of the cylinder body 84 is provided with a limit switch 82.

The electric motor 23 is activated to cause the piston rod 83 to move linearly in an advancing direction (leg-extending direction) or a retracting direction (leg-retracting direction) in accordance with rotation of the piston rod 83. Here, the piston rod 83 moves in the leg-extending direction to cause a piston part 83a of the piston rod 83 to hit the limit switch 82. Upon receiving a signal, the electric motor 23 stops and the mechanical brake 81 is activated. The piston rod 83 is thus arrested and locked at a leg-extending position (stretched position). According to the electric actuator 101, no hydraulic pressure is utilized for driving the piston rod 83. This allows elimination of the hydraulic system which has been traditionally indispensable, thus realizing a lighter aircraft.

SUMMARY OF THE INVENTION

Problems to be Solved by the Invention

In the electric actuator 101 illustrated in FIG. 3, however, when the aircraft takes off or lands with the piston rod 83 at the leg-extending position (stretched position), the screw shaft 3 and the mechanical brake 81 are required to receive an external force or impact acting through the piston rod 83; i.e., a heavy load is placed on the screw shaft 3 and the mechanical brake 81. This requires sufficient strength and braking performance of the devices, resulting in a very large member.

The present invention is made in view of the above mentioned condition. Thus, an object of the present invention is to provide an electric actuator which drives a piston rod by an electric motor via a screw shaft, which electric actuator is capable of reducing an external force or impact acting on the screw shaft when the piston rod is at the stretched position.

Means for Solving the Problems and Effects

As a result of an intensive study attempting to solve the above mentioned problem, the present inventors found that the above problem is solved by locking the piston rod with a fluid stored in the cylinder body, thus reducing the external force or impact acting on the screw shaft, when the piston rod is at the stretched position. The present invention is completed based on this finding.

In other words, the present invention is an electric actuator including a cylinder body, a screw shaft, a piston rod, a first port, a second port, and a cylinder chamber connecting passage. The cylinder body stores therein a fluid. The screw shaft is provided in the cylinder body and is rotated by an electric motor. The piston rod moves linearly as the screw shaft rotates. The first port is formed on an inner face of a rod-side cylinder chamber of the cylinder body, which cylinder chamber is located in a direction in which the piston rod advances. The second port is formed on an inner face of a head-side cylinder chamber of the cylinder body, which cylinder chamber is located in a direction in which the piston rod retracts. The cylinder chamber connecting passage connects the first port and the second port. In the electric actuator, a piston part of the piston rod closes the first port when the piston rod advances.

According to the structure, the piston part of the advancing piston closes the first port to block the cylinder chamber connecting passage. This causes the head-side cylinder chamber of the cylinder body to seal the fluid therein. When an external force or impact acts on the electric actuator in an retracting direction of the piston rod under such circumstances, the fluid in the head-side cylinder chamber as well as the screw shaft are subjected to the external force or impact. Thus, the present electric actuator is capable of distributing an external force or impact in the liquid, the external force or impact acting in the retracting direction of the piston rod when the piston rod is at the stretched position. This reduces such forces as an impact acting on the screw shaft. As a result, a compact and lightweight electric actuator is achieved, compared to a known electric actuator.

Further, the present invention is preferably provided with a nut into which the screw shaft is screwed, and an elastic member disposed between the nut and the piston part.

According to the structure, the external force or impact is absorbed by the elastic member, preventing the external force or impact from acting directly on the screw shaft due to the rigidity of the fluid, thus receiving the external force or impact with the entire cylinder body.

Further, the present invention is preferably provided with a reservoir which is fixed to a side portion of the cylinder, and whose one chamber storing a fluid therein is connected to the rod-side cylinder chamber.

According to the structure, the reservoir is capable of absorbing differential thermal expansion caused by the temperature of the fluid (high/low temperature), in addition to accumulating pressure of the fluid. This prevents unbalanced movement of the piston rod.

Further, the present invention is preferably provided with a first check valve whose forward direction is from the other chamber of the reservoir to the one chamber of the reservoir.

The structure prevents vacuumization of the rod-side cylinder chamber due to an external force or impact acting on the piston rod, the rod-side cylinder chamber sealing the fluid therein.

Further, the present invention is preferably provided with a connection valve which connects the head-side cylinder chamber and the one chamber of the reservoir.

According to the above structure, when the cylinder chamber connecting passage connecting the first port and the second port is clogged, the connection valve is activated. This allows connection between the head-side cylinder chamber and the rod-side cylinder chamber of the cylinder body via the one chamber of the reservoir. This ensures linear movement of the piston rod.

Further, the present invention is preferably provided with a second check valve provided to the piston part of the piston rod. A forward direction of the second check valve is from the rod-side cylinder chamber to the head-side cylinder chamber.

The structure prevents vacuumization of the head-side cylinder chamber sealing the fluid therein due to the external force or impact acting on the piston rod.

Further, the present invention is preferably provided with a relief valve which is provided to the piston part of the piston rod, and which connects the head-side cylinder chamber and the rod-side cylinder chamber when the pressure in the head-side cylinder chamber comes to be a predetermined value or more.

The structure allows the fluid in the head-side cylinder chamber to escape to the rod-side cylinder chamber when the external force or impact acting on the piston rod is greater than assumed, or thermal expansion of the fluid is greater than assumed due to increased temperature of the fluid in the head-side cylinder chamber. This prevents excess rise of the fluid pressure in the head-side cylinder chamber.

DETAILED DESCRIPTION OF THE PREFERRED EMBODIMENT

The following describes an embodiment of the present invention with reference to the figures. An actuator described below is for lifting a leg of a small aircraft; however, it is also employable as an actuator for lifting a leg of a medium or large aircraft. Further, the present electric actuator is also employable as an actuator for locking a door (opening/closing a door) or the like of an aircraft. Furthermore, the present electric actuator is applicable to a machine other than aircraft. Further, mainly oil is employed as the fluid to be stored in the electric actuator of the present invention; however, a liquid other than oil, or a gas such as air may be employed as the fluid. Note that the following embodiment is described as an example where oil is employed as the fluid.

(Structure of Electric Actuator)

Figure 1:
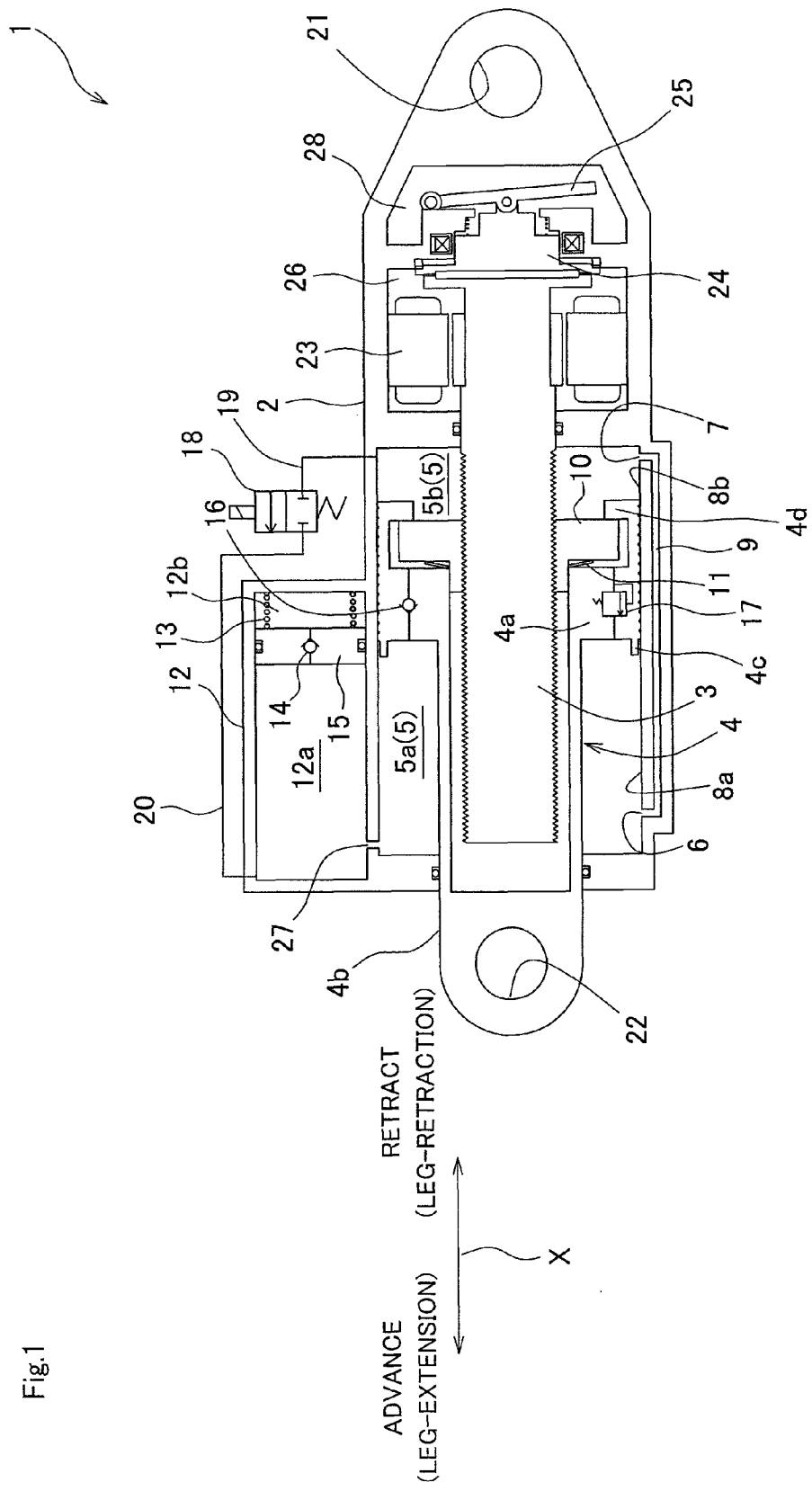
FIG. 1 is a schematic cross-sectional view of an electric actuator according to an embodiment of the present invention.
Figure 2:
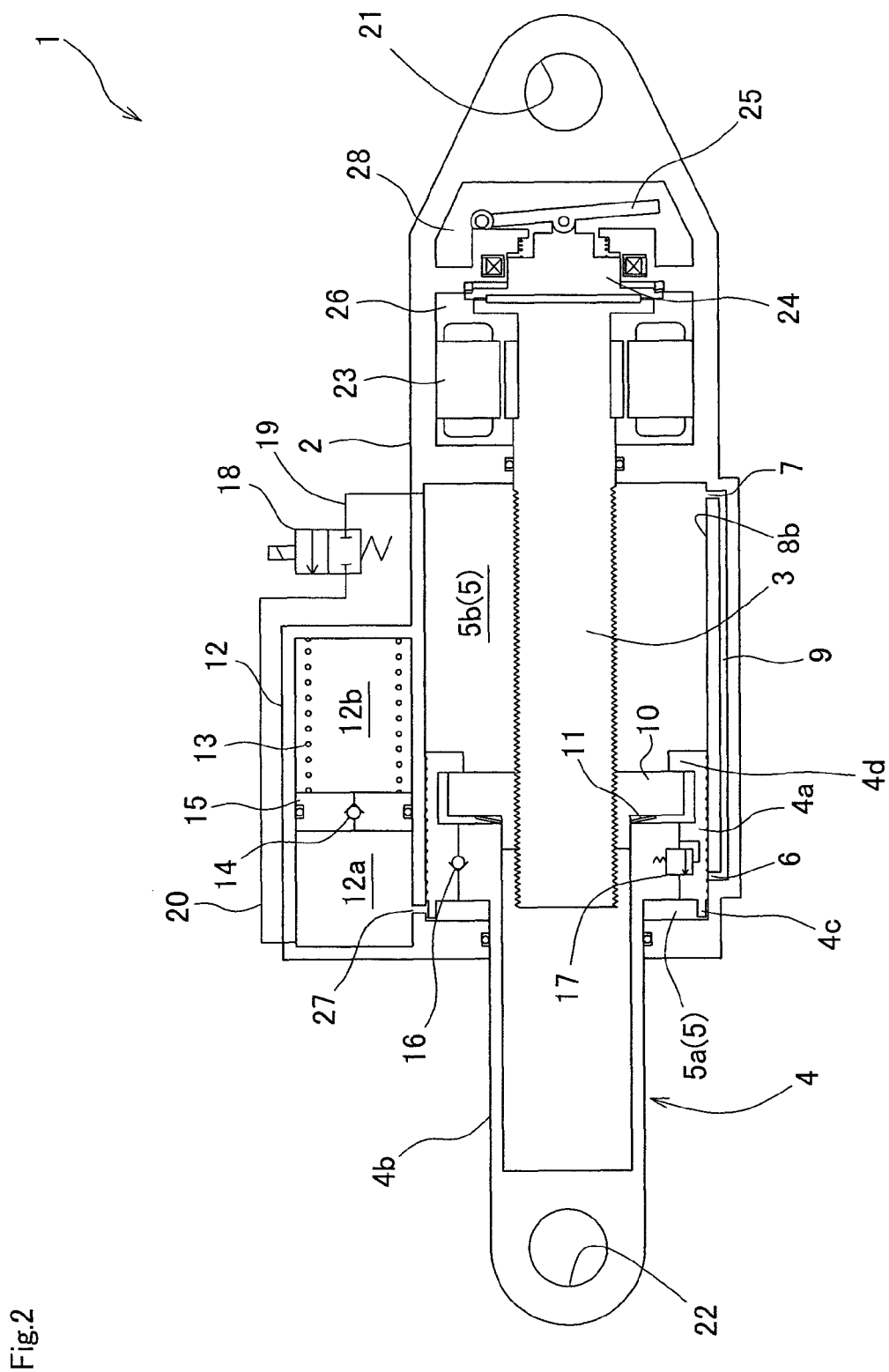
FIG. 2 is a schematic cross-sectional view of the electric actuator illustrated in FIG. 1, with the piston rod at a stretched position.

FIGS. 1 and 2 are schematic cross sectional views each illustrating an electric actuator 1 according to an embodiment of the present invention. FIG. 1 illustrates the electric actuator 1 with a piston rod 4 at a withdrawal position (retracted position). FIG. 2 illustrates the electric actuator 1 with the piston rod 4 at a stretched position (advanced position).

As illustrated in FIGS. 1 and 2, the electric actuator 1 includes: a cylinder body 2 which stores oil therein; an electric motor 23, an electromagnetic brake 24, a screw shaft 3, and a piston rod 4, provided in the cylinder body 2; and a reservoir 12 integrally fixed to (integrally formed with) the cylinder body 2 at a side portion thereof.

(Cylinder Body)

The cylinder body 2 has a cylindrical shape, and includes a cylinder chamber 5, a motor chamber 26, and a brake chamber 28. The cylinder chamber 5 is formed to a side of the cylinder body 2, to which side a leg of an aircraft is mounted. The motor chamber 26 and the brake chamber 28 are formed to a fuselage side of the cylinder body 2. Provided to an end portion of the fuselage side of the cylinder body 2 is an attach member 21 which attaches the cylinder body 2 to the fuselage. Note that the leg includes a wheel and an arm of the wheel of the aircraft.

The cylinder chamber 5 is separated into a cylinder chamber 5a on the rod side (hereinafter, rod-side cylinder chamber), and the cylinder chamber 5b on the head side (hereinafter, head-side cylinder chamber), by a later-described piston part 4a of the piston rod 4. In the cylinder chamber 5, the rod-side cylinder chamber 5a is located in a direction in which the leg of the aircraft is attached; i.e., a direction in which the piston rod 4 advances. In the cylinder chamber 5, the head-side cylinder chamber 5b is located in a direction in which the motor chamber 26 is provided; i.e., in a direction in which the piston rod 4 retracts.

An inner face 8a of the rod-side cylinder chamber 5a is provided with a first port 6 and a third port 27. The third port 27 is provided to an end portion of the inner face 8a of the rod-side cylinder chamber 5a, which end portion is located towards a direction in which the piston rod 4 advances. The first port 6 is provided to an end portion of the inner face 8a of the rod-side cylinder 5a, which end portion is located more towards a direction in which the piston rod 4 retracts than the third port 27 is. The inner face 8b of the head-side cylinder chamber 5b is provided with a second port 7. The second port 7 is provided to an end portion of an inner face 8b of the head-side cylinder chamber 5b, which end portion is located towards the direction in which the piston rod 4 retracts. Here, a side portion of the cylinder body 2 is provided with a cylinder chamber connecting passage 9 which connects the first port 6 and the second port 7. The cylinder chamber connecting passage 9 is a linear passage formed in the same direction as an X-direction in which the piston rod 4 moves linearly. Note that the cylinder chamber connecting passage 9 is not limited to a linear passage, as long as it connects the first port 6 and the second port 7. Being a linear passage extending in the X-direction, the cylinder chamber connecting passage 9 connects the first port 6 and the second port 7 at the shortest distance. This further prevents the cylinder chamber connecting passage 9 from clogging.

(Electric Motor)

Figure 3:
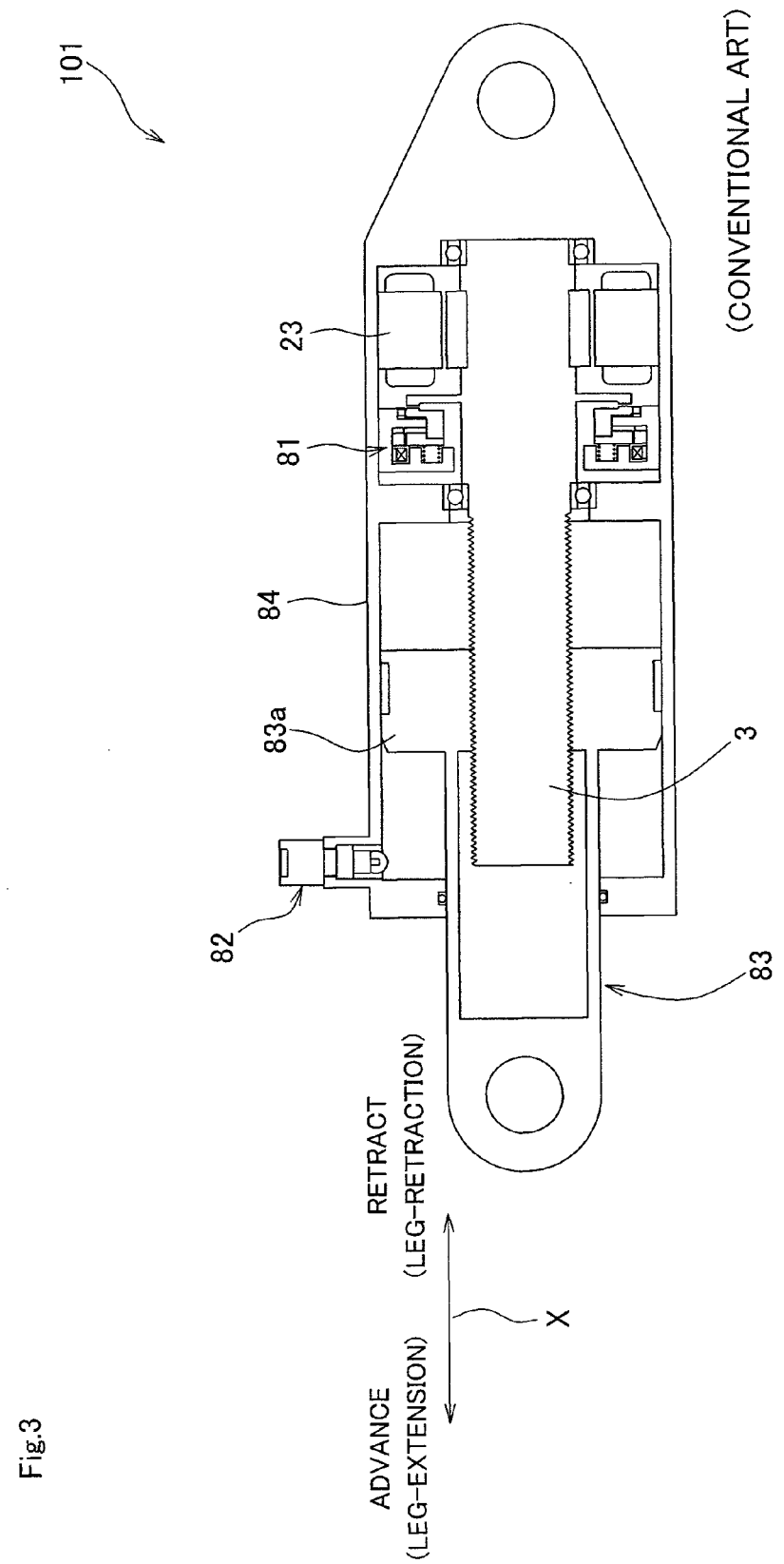
FIG. 3 is a schematic cross-sectional view of an actuator according to conventional art.

The electric motor 23 is for rotating the later-described screw shaft 3. The electric motor 23 is provided to the motor chamber 26. An encoder (not-illustrated) is built into the electric motor 23. The electric motor 23 can be halted at any position by a pulse signal from the encoder. Note that a necessary number of limit switches 82 illustrated in FIG. 3 may be provided to the cylinder body 2 or the like, each of the limit switches 82 being set to operate at a position that the piston rod 4 is intended to be stopped, and the electric motor 23 may be halted by a signal from any one of the limit switches 82.

(Electromagnetic Brake)

The electromagnetic brake 24 is a parking brake for arresting the rotation of the screw shaft 3. The electromagnetic brake 24 is provided to the brake chamber 28 formed adjacent to the motor chamber 26. Due to the electromagnetic brake 24, the piston rod 4 is completely prevented from moving in an advancing side (leg-extending side) due to its own weight or an empty weight of the leg of the aircraft when the piston rod 4 is at the withdrawal position (retracted position). Note that the braking performance (brake performance) of the electromagnetic brake 24 is required to merely arrest movement of the piston rod 4 in the advancing side (leg-extending side) caused by the empty weight of the piston rod 4 as described above. Thus, no further function is required of the electromagnetic brake 24. Further, the electromagnetic brake 24 includes a manual brake release lever 25.

(Screw Shaft)

Attached to the electric motor 23 is a screw shaft 3. The screw shaft 3 is provided in the cylinder chamber 5 and the motor chamber 26 in such a manner that a threaded portion of the screw shaft is present in the cylinder chamber 5. The cylinder chamber 5 and the motor chamber 26 are sealed. The seal is merely for preventing pressure at the time of impact from acting directly on the motor chamber 26 from the cylinder chamber 5. Thus, the seal is not indispensable. Further, a wet-running motor is employed as the electric motor 23 for the purpose of its cooling. Further, the screw shaft 3 is screwed into the nut 10. The electric motor 23 rotates the screw shaft 3 to cause the nut 10 to move linearly.

(Piston Rod)

The piston rod 4 is provided in the cylinder chamber 5. The piston rod 4 includes a rod part 4b and a piston part 4a. The rod part 4b is provided at its one end with an attach member 22 to which the leg of the aircraft is attached. The piston part 4a moves linearly (slide) along the inner faces 8a and 8b of the cylinder chamber 5.

Here, the rod part 4b is a hollow cylinder, and a screw shaft 3 is inserted therein. Provided inside the piston part 4a are a second check valve 16 and a relief valve 17. A forward direction of the second check valve 16 is a direction from the rod-side cylinder chamber 5a to the head-side cylinder chamber 5b of the cylinder chamber 5. Further, the relief valve 17 connects the head-side cylinder chamber 5b and the rod-side cylinder chamber 5a when the hydraulic pressure in the head-side cylinder chamber 5b comes to be a predetermined value or more.

Further, provided on an end face of the piston part 4a, which end face is located in a direction in which the piston rod 4 advances is provided with a ring protrusion 4c. The protrusion 4c is for ensuring a gap between a bottom face of the rod-side cylinder chamber 5a and the end face of the piston part 4a to ensure operations of the second check valve 16 and the relief valve 17, when the piston rod 4 is at the stretched position (advanced position) (see FIG. 2). Further, on a side of the piston part 4a towards which side the piston rod 4 retracts, a ring engaging member 4d is provided. The engaging member 4d engages with the nut 10 when the piston rod 4 retracts (withdraws).

Provided between the piston part 4a and the nut 10 is a disc spring 11 (elastic member). Note that the elastic member to be provided between the piston part 4a and the nut 10 is not limited to the disc spring 11: The elastic member may be a rubber ring having a predetermined thickness.

(Reservoir)

The reservoir 12 is integrally formed with the cylinder body 2 at a side thereof, the side located towards a direction in which the piston rod 4 advances. The reservoir 12 is separated into a chamber 12a and a chamber 12b by a piston 15. The chamber 12a stores oil therein, and the chamber 12b is provided with a coil spring 13 therein (the chamber 12b stores therein the coil spring 13 and air). Here, the chamber 12a of the reservoir 12 and the rod-side cylinder chamber 5a are connected by the third port 27. Further, inside the piston 15 is provided with a first check valve 14 therein whose forward direction is from the chamber 12b to the chamber 12a. Note that the coil spring 13 is not indispensable. The coil spring 13 is for emergency use, to release brake and force the oil to flow.

Further, the chamber 12a of the reservoir 12 and the head-side cylinder chamber 5b of the cylinder chamber 5 are connected by passages 19 and 20 via a connection valve 18. The connection valve 18 is a two-position two-port electromagnetic valve having a block position for blocking the passages 19 and 20, and a connect position for connecting the passage 19 and the passage 20. Although the connection valve 18 is an electromagnetic valve in the present embodiment, it may be a hydraulic pilot valve or a pneumatic pilot valve. Further, the connection valve 18 is provided to the cylinder body 2 or a side portion of the reservoir 12, or the like.

(Operation of Electric Actuator)

The following describes operation of the electric actuator 1.

(Advancement of Piston Rod)

The following first describes operation of the piston rod 4 when moving from the withdrawal position (retracted position) (FIG. 1) to the stretched position (advanced position) (FIG. 2). When a control unit of the aircraft gives a command to extend the leg, the electromagnetic brake 24 is released and the electric motor 23 is driven. This rotates the screw shaft 3, causing the piston rod 4 to advance with the nut 10. Under such a circumstance, the oil flows from the rod-side cylinder chamber 5a to the head-side cylinder chamber 5b of the cylinder body 2 through the cylinder chamber connecting passage 9. When the piston rod 4 reaches the stretched position (advanced position), the piston part 4a of the piston rod 4 closes the first port 6. This halts the flow of oil from the rod-side cylinder chamber 5a to the head-side cylinder chamber 5b, causing the rod-side cylinder chamber 5a and the head-side cylinder chamber 5b to seal the oil therein. Note that when the piston rod 4 has reached the stretched position (advanced position), the electric motor 23 is halted and the electromagnetic brake 24 is activated by a signal from the encoder. Further, the oil hermetically sealed into the head-side cylinder chamber 5b locks the piston rod 4 (the piston rod 4 does not move in the retracting direction). Thus, the electromagnetic brake 24 is not required to be activated.

Even in case of a failure in an electrical system, the piston part 4a of the piston rod 4 closes the first port 6, causing both of the rod-side cylinder chamber 5a and the head-side cylinder chamber 5b to seal the oil therein. As a result, the piston rod 4 stops, and its movement in the retracting direction is halted.

(Retraction of Piston Rod)

When the control unit of the aircraft gives a command to retract the leg, the connection valve 18 is excited, the electromagnetic brake 24 is released, and the electric motor 23 is driven. The connection valve 18 is excited to connect the chamber 12a of the reservoir 12 with the head-side cylinder chamber 5b. The electric motor 23 rotates the screw shaft 3, causing the piston rod 4 to retract with the nut 10. Under such a circumstance, the oil flows from the head-side cylinder chamber 5b to the chamber 12a of the reservoir 12 through the passages and 20. When the first port 6 is opened, the energization of the connection valve 18 stops, and the oil flows from the head-side cylinder chamber 5b to the rod-side cylinder 5a thereafter through the cylinder chamber connecting passage 9. When the piston rod 4 has reached the withdrawal position (retracted position) (determined by a signal from the encoder), the electric motor 23 is halted, and the electromagnetic brake 24 is activated.

According to the electric actuator 1 of the present invention, the piston part 4a of the advancing piston rod 4 closes the first port 6, blocking the cylinder chamber connecting passage 9, as described above. This causes the head-side cylinder chamber 5b of the cylinder body 2 to seal the oil therein. When an external force or impact acts on the electric actuator in the retracting direction of the piston rod 4 under such circumstances, the oil sealed in the head-side cylinder chamber 5b as well as the screw shaft 3 are subjected to the external force or impact. Thus, the electric actuator 1 is capable of distributing an external force or impact in the oil, the external force or impact acting in the retracting direction of the piston rod 4 at the stretched position. This reduces such forces as an impact acting on the screw shaft 3. As a result, an actuator smaller and lighter than a conventional one is realized.

Further, the external force or impact is absorbed by the disc spring 11 provided between the piston part 4a and the nut 10, preventing the external force or impact from acting directly on the screw shaft 3 due to the rigidity of the oil, thus receiving the external force or impact with the entire cylinder body 2.

Further, in addition to pressure accumulation of the oil, the reservoir 12 including the coil spring 13 is able to absorb differential thermal expansion caused by the temperature (high/low temperature) of the oil. This prevents unbalanced movement of the piston rod 4. Further, when an external force or impact acts in the retracting direction of the piston rod 4 at the stretched position (advanced position), the rod-side cylinder chamber 5a of the cylinder body 2 tends to be vacuumized, the rod-side cylinder chamber 5a sealing the oil therein. However, the first check valve 14 provided to the piston 15 prevents vacuumization of the rod-side cylinder chamber 5a.

Further, when the piston rod 4 at the stretched position (advanced position) attempts to move in the advancing direction due to its reaction against an external force or impact, the head-side cylinder chamber 5b of the cylinder body 2 tends to be vacuumized. However, the oil is flown from the rod-side cylinder chamber 5a to the head-side cylinder 5b by the second check valve 16 provided to the piston rod 4a. This prevents vacuumization of the head-side cylinder chamber 5b.

Further, when the piston rod 4 is at the stretched position (advanced position), the relief valve 17 provided to the piston part 4a allows the oil in the head-side cylinder chamber 5b to escape to the rod-side cylinder chamber 5a when the external force or impact acting in the retracting direction of the piston rod 4 is greater than assumed, or thermal expansion of the oil is greater than assumed due to increased temperature of the oil in the head-side cylinder chamber 5b. This prevents excess rise in the hydraulic pressure in the head-side cylinder chamber 5b.

In case the cylinder chamber connecting passage 9 is clogged, which cylinder chamber connecting passage 9 connects the first port 6 and the second port 7, the connection valve 18 is activated to connect the head-side cylinder chamber 5b and the rod-side cylinder chamber 5a of the cylinder body 2 via the chamber 12a of the reservoir 12, thus ensuring linear movement of the piston rod 4.

The foregoing has described the embodiment of the present invention. The present invention, however, is not limited to the above embodiment, and thus various changes can be made to the present invention without departing from the scope of the claims.

What is claimed is:

1. An electric actuator comprising:
    a cylinder body which stores therein a fluid;
    a screw shaft which is provided in the cylinder body, and is rotated by an electric motor;
    a piston rod which moves linearly in accordance with rotation of the screw shaft;
    a first port formed on an inner face of a rod-side cylinder chamber of the cylinder body, which cylinder chamber is located in a direction in which the piston rod advances;
    a second port formed on an inner face of a head-side cylinder chamber of the cylinder body, which cylinder chamber is located in a direction in which the piston rod retracts;
    a cylinder chamber connecting passage connecting the first port and the second port, wherein the piston part of the piston rod closes the first port when the piston rod advances;
    a nut into which the screw shaft is screwed; and
    an elastic member provided between the nut and the piston part.

2. The electric actuator according to claim 1, further comprising a reservoir which is fixed to a side portion of the cylinder body, and whose one chamber storing a fluid therein is connected to the rod-side cylinder chamber.

3. The electric actuator according to claim 2, further comprising a check valve whose forward direction is from another chamber of the reservoir to the one chamber of the reservoir.

4. The electric actuator according to claim 2, further comprising a connection valve which connects the head-side cylinder chamber and the one chamber of the reservoir.

5. The electric actuator according to claim 1, further comprising a check valve which is provided to the piston part of the piston rod, and whose forward direction is from the rod-side cylinder chamber to the head-side cylinder chamber.

6. The electric actuator according to claim 1, further comprising a relief valve which is provided to the piston part of the piston rod, and which connects the head-side cylinder chamber and the rod-side cylinder chamber when pressure in the head-side cylinder chamber comes to be a predetermined value or more.

7. An electric actuator comprising:
    a cylinder body which stores therein a fluid;
    a screw shaft which is provided in the cylinder body, and is rotated by an electric motor;
    a piston rod which moves linearly in accordance with rotation of the screw shaft;
    a first port formed on an inner face of a rod-side cylinder chamber of the cylinder body, which cylinder chamber is located in a direction in which the piston rod advances;
    a second port formed on an inner face of a head-side cylinder chamber of the cylinder body, which cylinder chamber is located in a direction in which the piston rod retracts;
    a cylinder chamber connecting passage connecting the first port and the second port, wherein the piston part of the piston rod closes the first port when the piston rod advances;

a reservoir which is fixed to a side portion of the cylinder body, and whose one chamber storing a fluid therein is connected to the rod-side cylinder chamber; and a check valve whose forward direction is from another chamber of the reservoir to the one chamber of the reservoir.

8. An electric actuator comprising:

a cylinder body which stores therein a fluid;

a screw shaft which is provided in the cylinder body, and is rotated by an electric motor;

a piston rod which moves linearly in accordance with rotation of the screw shaft;

a first port formed on an inner face of a rod-side cylinder chamber of the cylinder body, which cylinder chamber is located in a direction in which the piston rod advances;

a second port formed on an inner face of a head-side cylinder chamber of the cylinder body, which cylinder chamber is located in a direction in which the piston rod retracts;

a cylinder chamber connecting passage connecting the first port and the second port, wherein the piston part of the piston rod closes the first port when the piston rod advances; and a check valve which is provided to the piston part of the piston rod, and whose forward direction is from the rod-side cylinder chamber to the head-side cylinder chamber.

9. An electric actuator comprising:

a cylinder body which stores therein a fluid;

a screw shaft which is provided in the cylinder body, and is rotated by an electric motor;

a piston rod which moves linearly in accordance with rotation of the screw shaft;

a first port formed on an inner face of a rod-side cylinder chamber of the cylinder body, which cylinder chamber is located in a direction in which the piston rod advances;

a second port formed on an inner face of a head-side cylinder chamber of the cylinder body, which cylinder chamber is located in a direction in which the piston rod retracts;

a cylinder chamber connecting passage connecting the first port and the second port, wherein the piston part of the piston rod closes the first port when the piston rod advances; and a relief valve which is provided to the piston part of the piston rod, and which connects the head-side cylinder chamber and the rod-side cylinder chamber when pressure in the head-side cylinder chamber comes to be a predetermined value or more.

* * * * *